United States Patent [19]

Tuggle

[11] Patent Number: 4,538,657

[45] Date of Patent: Sep. 3, 1985

[54] WHEEL FOR LAND VEHICLES AND METHOD FOR MOVING SUCH VEHICLES OVER SOFT OR IRREGULAR SURFACES

[76] Inventor: William E. Tuggle, 212 65th St., Virginia Beach, Va. 23451

[21] Appl. No.: 467,051

[22] Filed: Feb. 16, 1983

[51] Int. Cl.³ .................... B60C 5/12; B60B 5/02; B60B 3/08

[52] U.S. Cl. .................... 152/375; 152/454; 152/385; 301/63 DS

[58] Field of Search ............ 301/63 DS; 152/330 RF, 152/352 R, 385, 388, 330 R, 349, 350, 375

[56] References Cited

U.S. PATENT DOCUMENTS

| | | | |
|---|---|---|---|
| 697,621 | 4/1902 | Greene | 152/330 R |
| 884,702 | 4/1908 | Bowden . | |
| 1,090,727 | 3/1914 | Leach, Jr. | 152/385 X |
| 1,110,849 | 9/1914 | Wheeling | 152/385 X |
| 1,318,119 | 10/1919 | Wallace . | |
| 1,457,287 | 5/1923 | Trenholme . | |
| 1,493,672 | 5/1924 | Henderson . | |
| 1,846,269 | 2/1932 | Musselman . | |
| 1,869,620 | 8/1932 | Rogers et al. . | |
| 1,875,643 | 10/1932 | Musselman . | |
| 1,918,553 | 7/1933 | Musselman . | |
| 1,921,772 | 8/1933 | Paull | 152/352 R |
| 1,965,058 | 7/1934 | Seabra | 301/63 DS X |
| 2,268,249 | 12/1941 | Goodrich . | |
| 2,367,825 | 1/1945 | Shaw | 301/63 |
| 2,435,186 | 1/1948 | Trexler | 152/330 |
| 2,601,464 | 6/1952 | Tanke | 152/327 |
| 2,607,392 | 8/1952 | Snyder . | |
| 2,608,230 | 8/1952 | Cuesta | 152/9 |
| 2,713,373 | 7/1955 | Daugherty | 152/384 |
| 2,824,592 | 2/1958 | Neisler, Jr. et al. . | |
| 2,843,171 | 2/1958 | Howe . | |
| 3,024,831 | 3/1962 | McConkie . | |
| 3,047,041 | 7/1962 | Bottasso et al. | 152/363 |
| 3,116,778 | 1/1964 | Herzegh et al. | 152/330 |
| 3,154,126 | 10/1964 | Katter . | |
| 3,470,933 | 10/1969 | Molnar | 152/429 X |
| 3,613,762 | 10/1971 | Reinhart, Jr. | 152/352 R X |
| 3,799,617 | 3/1974 | Holland, Sr. | 301/5 P |
| 3,827,369 | 8/1974 | Mueller . | |
| 3,945,419 | 3/1976 | Kosanke . | |
| 3,951,192 | 4/1976 | Gardner et al. | 152/353 R X |
| 3,965,957 | 6/1976 | Nakasaki | 152/400 |
| 3,977,454 | 8/1976 | Yaucher et al. | 301/63 PW X |
| 3,983,918 | 10/1976 | French | 152/353 R |
| 3,998,258 | 12/1976 | Grawey et al. | 152/405 |
| 4,031,937 | 6/1977 | Georgia et al. | 159/56 X |
| 4,043,370 | 8/1977 | Unwin et al. | 152/354 |
| 4,058,344 | 11/1977 | Dyson | 301/63 PW X |
| 4,077,452 | 3/1978 | Carn | 152/327 |
| 4,081,015 | 3/1978 | Mitchell | 152/379.1 |
| 4,146,992 | 4/1979 | Smith | 301/63 C X |
| 4,155,393 | 5/1979 | Grawey | 152/353 |
| 4,168,732 | 9/1979 | Monzini | 152/353 R |
| 4,174,871 | 11/1979 | Brannan | 301/7 |
| 4,203,481 | 5/1980 | Ranik, Jr. | 152/330 |
| 4,253,511 | 3/1981 | Curtiss, Jr. | 152/330 RF |
| 4,253,512 | 3/1981 | Yoshioka et al. | 152/353 |
| 4,267,992 | 5/1981 | Harper, Sr. | 152/330 RF X |

FOREIGN PATENT DOCUMENTS

| | | | |
|---|---|---|---|
| 256390 | 8/1948 | Switzerland | 301/63 DS |

OTHER PUBLICATIONS

Dura-Tech Tire Design & Performance Characteristics, published by Zedron Inc., formerly of Los Altos, California, 39 pages, publication date uncertain but suspected to have been prior to Feb. 16, 1983.

*Primary Examiner*—David A. Scherbel
*Attorney, Agent, or Firm*—Pollock, Vande Sande & Priddy

[57] ABSTRACT

A wheel is disclosed for use on land vehicles such as small manually drawn trailers and similar carriers, the wheel having a tire supporting rim (12) and a low pressure tire (48) engaging the rim, the tire comprising a thin walled torus (50) of elastomeric material, the torus having an inner diameter surface (52) engaging the rim, an inflation valve (54) and an outer diameter surface (56) for contacting a soft or irregular support surface; so that, the tire deforms or flattens substantially when it contacts such surfaces with an axle load applied to the wheel, thereby facilitating movement of a vehicle over such surfaces. A method of moving such vehicles is also disclosed.

14 Claims, 2 Drawing Figures

WHEEL FOR LAND VEHICLES AND METHOD FOR MOVING SUCH VEHICLES OVER SOFT OR IRREGULAR SURFACES

DESCRIPTION

1. Technical Field

The present invention concerns wheels for land vehicles and methods for moving such vehicles over support surfaces. More particularly, the invention is related to a wheel and method particularly suited for moving vehicles over soft support surfaces such as beach sand or irregular support surfaces such as rocky terrain.

2. BACKGROUND ART

For many decades, land vehicles and also airplanes have been provided with wheels comprising a rim and a pneumatic tire mounted on the rim. Due to the rather high angular velocities of such wheels during use and the danger of rupture of the tire due to encounters with obstacles in its path, the casings of prior art tires almost uniformly have been provided with extensive reinforcements in the forms of fabrics or cords made from natural or synthetic materials or metal, or both. In most early applications of such pneumatic tires, the tire comprised a reinforced carcass having a U-shaped cross-sectional configuration with annular beads which engaged the rim. A torus-shaped inner tube was positioned within the tire carcass in engagement with both the carcass and the outer diameter of the rim. In such wheels, which are still in extensive use, the rim and tire carcass provide the necessary mechanical strength and the tube provides the necessary airtight interior volume during operation. More recently, tubeless tires have come into general use in which the carcass of the tire is sealed directly to the rim to provide the airtight interior volume, thus eliminating any need for an inner tube. To ensure adequate load bearing capacity, to retain such prior art tires on their rims and to ensure that such wheels can resist the torque applied to drive and brake such vehicles, the tire carcasses have typically been quite rigid and far less flexible than their inner tubes. Both tube type and tubeless tires have been inflated to a rather high operating pressure, typically well in excess of 25 pounds per square inch. When such prior art wheels are mounted on a vehicle and subjected to an axle load, the tire flattens very slightly and, in general, retains an exterior appearance quite similar to that of an uninflated, unloaded wheel.

Such prior art wheels are admirably suited for use on vehicles which operate over relatively hard, even support surfaces. However, should the vehicle encounter a soft surface such as beach sand or a rather irregular surface such as rocky terrain, then the performance of the prior art wheel often is less than satisfactory. Specifically, the contact area between the prior art tire and the underlying support surface is so small that the pressure per unit area is extremely high on the underlying support surface, which often causes the wheels of the vehicle to sink at least partially into soft support surfaces such as beach sand. On irregular surfaces, the relatively hard, unyielding nature of such prior art tire carcasses and their high inflation pressure make it difficult for the tire to yield to obstacles in its path so that the vehicle can go forward with a minimum of applied power. In some instances, large expensive wide track tires have been used in self-powered vehicles of facilitate their movement over soft and irregular surfaces due to the increased contact area of the wide track tire.

A variety of carriers or vehicles have been developed in recent years which are intended to be pulled over soft or irregular surfaces, usually manually but also by self-powered tractors. For example, U.S. Pat. No. 4,327,933 granted to W. E. Tuggle for Sailboat Carrier discloses a type of carrier suitable for moving catamaran sailboats across wide expanses of beach sand and into the water. While small wheels of the prior art type previously discussed can be used on such carriers, a still significant effort is required to move the loaded carrier across a beach. A need has continued to exist for a wheel having both a much larger contact surface to minimize sinking into soft surfaces and a more elastic and flexible tire body both to permit easy deformation of the tire as it rolls over obstacles in its path and to permit the contact area of the tire to increase very substantially under load.

DISCLOSURE OF THE INVENTION

The primary object of the present invention is to provide an improved wheel for land vehicles which will facilitate moving such vehicles over soft or irregular support surfaces with a reduced effort compared to prior art wheel assemblies.

A further object of the invention is to provide an improved method for moving land vehicles over such surfaces.

Yet another object of the invention is to provide an improved wheel having a low pressure tire which flattens substantially during normal operation to provide a large area engaging the underlying support surface, an area which increases substantially as the load on the wheel increases.

Still another object of the invention is to provide such a wheel which is inexpensive to manufacture and simple to assemble for use.

The above objects of the invention are provided only by way of example. Thus, other desirable objectives and advantages inherently achieved by the disclosed invention may occur or become apparent to those skilled in the art. Nonetheless, the scope of the invention is to be limited only by the appended claims.

A wheel in accordance with the invention comprises a tire supporting rim having a substantially cylindrical outer surface for engaging a tire and a central opening for engaging an axle of a vehicle. Mounted on the rim is a low pressure tire which engages the cylindrical outer surface and comprises a thin-walled torus of elastomeric material. The wall of the tire is substantially free of reinforcing elements which would limit its elasticity and flexibility. As used in this specification, "torus" means a surface or slid shaped like a doughnut and formed by revolving a circle about a line in the plane of the circle without intersecting the line with the circle. The torus-like tire has an inner diameter surface engaging the rim and a conventional inflation stem or inflation needle valve for inflating the tire to a low pressure, preferably less than 10 psi. The outer diameter surface of the tire directly contacts the underlying support surface so that the tire, when loaded, will deform or flatten substantially where it contacts soft or irregular support surfaces, thereby reducing rolling function between the tire and the support surface, reducing bouncing and generally facilitating movement of an associated vehicle over such surfaces.

In one embodiment, the rim of the wheel comprises a pair of oppositely, axially extending support flanges for engaging the tire on either side as the tire deforms or flattens during use. Preferably, these support flanges comprise radially outwardly flaring conical portions and axially extending cylindrical flanges extending from the conical portions, both of which engage the tire as it flattens. The rim may be integral or separable into axially extending halves and the tire may comprise a radially inwardly extending flange or plurality of tabs captured between such halves in the assembled wheel.

To distribute the load of the vehicles over a large area of the substantially flattened tire, the axial length of the rim preferably is greater than or equal to twice the undeformed radius of the circle of revolution of the torus but no greater than $\pi$ times this radius. Thus, should the tire flatten completely, the load of the vehicle will be spread over a large portion of the tire, providing a still significant contact surface and minimizing damage to the tire itself. To prevent the tire from working its way off the rim during operation, the diameter of the cylindrical flange portions preferably is greater than the diameter of the inner diameter surface of the tire but not more than three times larger.

In accordance with the method of the invention, a vehicle is provided with at least one wheel comprising a tire supporting rim with a substantially cylindrical outer surface for engaging a tire and a central opening for engaging an axle. A low pressure tire is mounted on this rim, the tire comprising a thin-walled torus of elastomeric material, the tire having an inner diameter surface for engaging the rim, means for inflating the torus to a low pressure and an outer diameter surface for directly contacting the underlying support surface. Such a tire is inflated to a low pressure sufficient to allow the tire to deform or flatten substantially when the torus contacts soft or irregular support surfaces as a vehicle movdes across such surfaces.

BEST MODE FOR CARRYING OUT THE INVENTION

Figure 1:
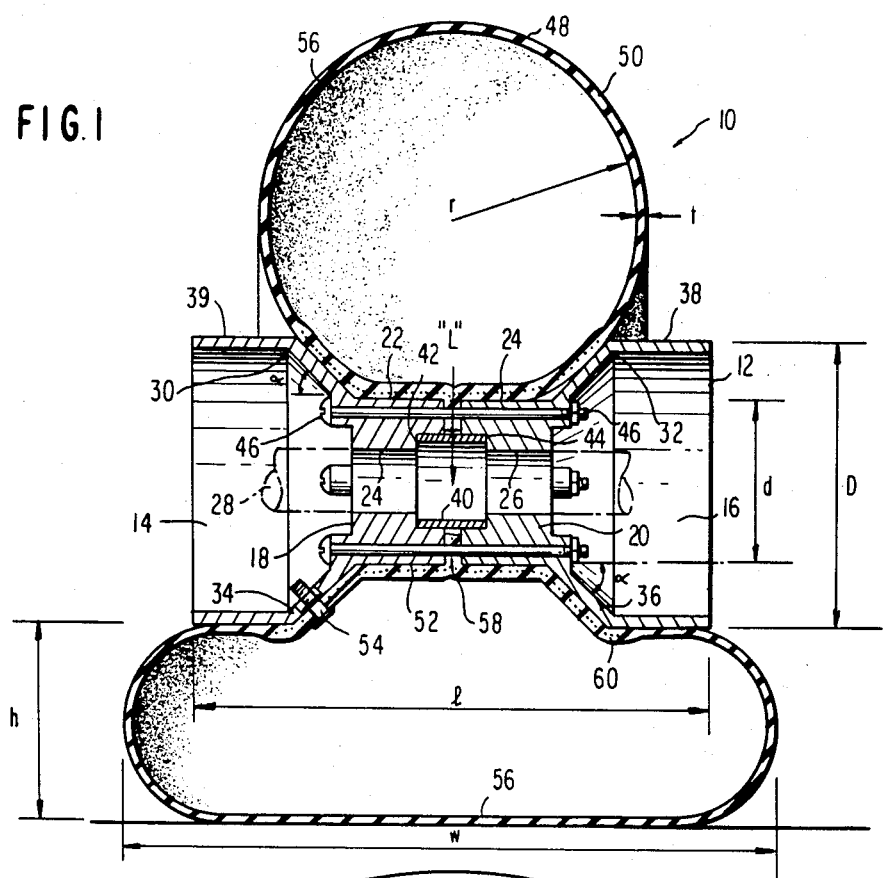
FIG. 1 shows a sectional elevation view of a wheel according to the present invention, indicating the substantially flattened configuration assumed by the torus-like tire when a load is applied to the assembly.

The following is a detailed description of a preferred embodiment of the invention, reference being made to the drawing in which like reference numerals identify like elements of structure in the figures.

Figure 2:
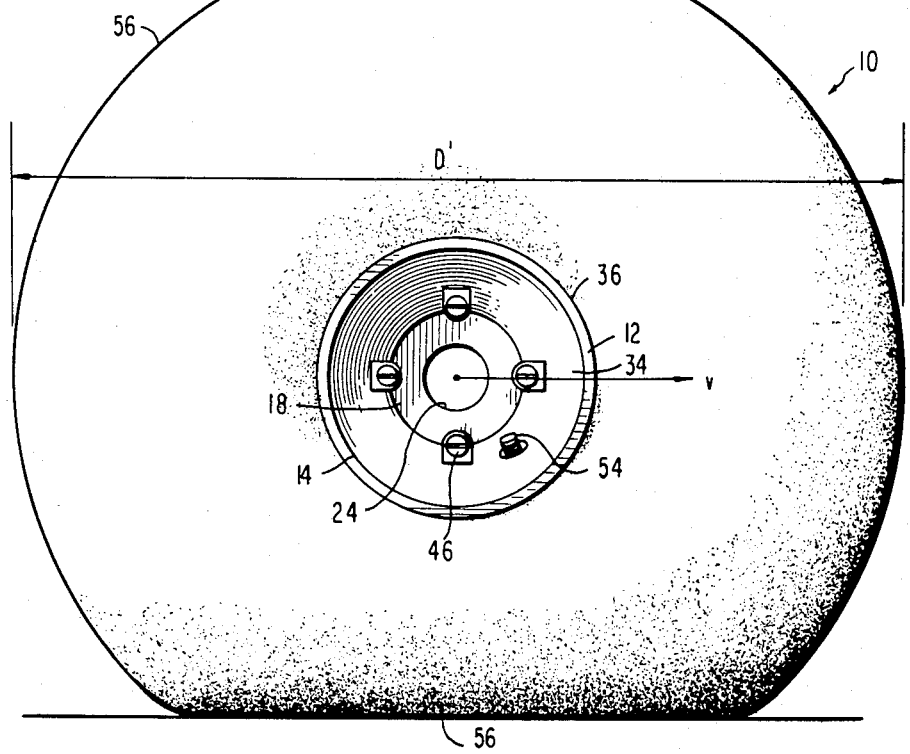
FIG. 2 shows a side elevation view of a wheel according to the invention, as seen from the left in FIG. 1.

Referring simultaneously to FIGS. 1 and 2, a wheel 10 according to the invention comprises a tire supporting rim 12 made up from a pair of virtually identical rim halves 14 and 16. The halves comprise central cylindrical portions 18, 20 having substantially cylindrical outer surfaces 22, 24 of diameter d, for engaging the low pressure tire according to the invention. Central bores 24, 26 are provided in each half for receiving a vehicle axle 28, illustrated in phantom. At their axially outer ends, cylindrical portions 18, 20 are joined to oppositely, axially extending support flanges 30, 32 having radially outwardly flaring conical portions 34, 36 with cone angles $\alpha$ in the range of 20° to 80°. A pair of axially extending cylindrical flanges 38, 39 are joined to conical portions 34, 36. Each cylindrical flange has a diameter D which is larger than but preferably no more than three times the length of diameter d, in order to prevent the low pressure tire from working its way from rim 12 during use. Between halves 14, 16, a cylindrical spacer 40 is received in a pair of oppositely facing recesses 42, 44 provided at the inner ends of cylindrical portions 18, 20. In some applications, it may be desirable to provide rim 12 with a suitable roller, ball or plain bearing for engaging shaft 28. Finally, the halves of rim 12 are joined by suitable fasteners such as bolt and nut pairs 46 which extend through cylindrical portions 18, 20, as illustrated.

Cylindrical outer surfaces 22, 24 and the outer surfaces of conical portions 34, 36 engage a low pressure readily deformable tire 48 according to the present invention. A tire comprises a thin-walled torus 50 of an elastomeric material such as 30% EPDM rubber with furnace black pigment, the rubber having the properties of Shore A 50, tensile strength 1700 psi, modulus of elasticity at 300% elongation 500 (rheometer), tear strength 150 lbs with B die. In one actual embodiment, as inflated the thickness of the torus was approximately 0.125 inch, the radius r of the circle of revolution of the torus was approximately 3.0 inches and the overall diameter D' of the torus was approximately 17.5 inches. The inner diameter surface 52 of torus 50 engages the outer surfaces of the rim 12 as previously indicated and has approximately the same diameter. In the same actual embodiment, diameter d was approximately 8.75 inches and diameter D was approximately 13.75 inches. Preferably, the axial length l of the assembled rim 12 is greater than or equal to twice radius r but no greater than $\pi$ times radius r, in order to provide adequate contact surface between the rim and the tire as the tire deforms during use.

Tire 48 is provided with a means 54 for inflation to a low pressure, such as a conventional valve stem member which extends through a hole in conical portion 34, or an inflation needle valve of the type used in basketballs, for example. In use, torus 50 preferably is inflated to no more than 10 psi in order to ensure that the tire will flatten or deform in the manner illustrated and thereby provide sufficient contact surface to reduce rolling friction between tire 48 and its support surface and thereby permit an associated vehicle to move easily over soft or irregular support surfaces. As the load on the tire increases, the contact surface of the tire increases as well. Pressure as low as 3 psi has proven suitable for many applications. Such support surfaces are contacted directly by the outer diameter surface 56 of torus 50. When tire 48 is made from an elastomeric material having elasticity and flexibility such as those of the type of material mentioned above and is inflated to such a low pressure, the tire will flex under load to flatten substantially from its unloaded configuration and will continue to flatten as the load is increased. Thus, the tire provides an enlarging contact area between its outer diameter surface and the underlying soft or irregular surfaces. As a result, rolling friction is reduced. For the same reasons, the tire also will stretch to deform substantially when it encounters and rolls over obstacles under load. Thus, bouncing is reduced. Tire 48 can be made by conventional extruding and molding techniques used in the rubber industry to make inner tubes, bladders and the like.

Although such is not necessary in tires made in accordance with the present invention, a central, radially inwardly directed flange 58 or a similarly oriented plurality of tabs may be captured between the inner ends of cylindrical portions 18, 20 to provde additional assurance that the tire will not move from its rim. Similarly, reinforcing strands or cords 60 may be provided in the wall of torus 50 in the area where the tire engages its rim, in order to provide additional strength at that location; however, a significant advantage of the present invention is that the use of such reinforcements is not necessary at any place in the tire and is particularly undesirable in the wall adjacent contact surface 56 since such reinforcements would limit the ability of the tire to flatten or deform in the preferred manner.

Having described my invention in sufficient detail to enable those skilled in the art to make and use it, I claim:

1. An improved tire-rim combination for land vehicles intended to be operated on soft support surfaces such as beach sand or irregular support surfaces such as rocky terrain, said combination comprising:
a low pressure tire comprising a thin-walled torus of elastomeric material, said torus having an inner diameter surface for engaging a tire supporting rim, means for inflating said torus to a low pressure configuration and an outer diameter surface for contacting said soft or irregular support surfaces;
a tire supporting rim having a central portion with a substantially cylindrical outer surface for engaging said inner diameter surface of said tire, a central opening for engaging an axle, a pair of oppositely, axially extending support flange means for engaging said tire on either side as said tire deforms or flattens, each support flange means having a radially, outwardly flaring conical portion extending from said central portion and an axially extending cylindrical flange extending from said conical portion, the axial length of said rim being greater than or equal to twice the undeformed radius of the circle of revolution of said torus but no greater than $\pi$ times said radius,
whereby said torus deforms or flattens substantially when said tire contacts said surfaces with an axle load applied to said wheel, thereby facilitating movement of an associated vehicle over such surfaces.

2. An improved tire-rim combination according to claim 1, wherein the diameter of said cylindrical flange portion is greater than the diameter of said inner diameter surface but less than or equal to three times said diameter of said inner diameter surface.

3. An improved tire-rim combination for land vehicles intended to be operated on soft support surfaces such as beach sand or irregular support surfaces such as rocky terrain, said combination comprising:
a low pressure tire comprising a thin-walled torus-like body of elastomeric material, said body having an inner diameter surface for engaging a tire supporting rim, means for inflating said body to a low pressure configuration and an outer diameter surface for contacting said soft or irregular support surfaces, said tire further comprising a radially inwardly extending flange;
a tire supporting rim having a substantially cylindrical outer surface for engaging said inner diameter of said tire, a central opening for engaging an axle, a pair of oppositely, axially extending support flange means for engaging said tire on either side as said tire deforms or flattens, said rim being separable into axially extending halves between which said radially inwardly extending flange is captured in the assembled wheel, and means for securing said halves to each other.

4. An improved tire-rim combination for land vehicles intended to be operated on soft support surfaces such as beach sand or on irregular support surfaces such as rocky terrain, said combination comprising:
a low pressure tire for engaging a tire supporting rim, said tire comprising a thin-walled torus-like body of elastomeric material wherein the wall of said tire located adjacent to the said soft support surfaces or said irregular support surfaces is at least substantially free from reinforcing fabrics or cords, said body having an inner diameter surface for engaging such a rim, said tire further comprising means for inflating said body to a low pressure configuration and an outer diameter surface for contacting said soft or irregular support surfaces; said elastomeric material of said thin-walled body having such elasticity and flexibility and said low pressure being up to 10 psi and being such that when said body is mounted on such a rim, is inflated to said low pressure and is subjected to an axle load, said tire flexes to flatten substantially from its unloaded configuration and continues to flatten as said load is increased, so that said tire provides an enlarging contact area between said outer diameter surface and said soft surfaces as said load is increased whereby rolling friction is reduced between said tire and said soft surface, and said tire also stretches to deform substantially when said tire encounters an obstacle when said load is applied, whereby bouncing of said tire is reduced; and
a tire supporting rim having a substantially cylindrical outer surface engaging said inner diameter surface of said tire and a central opening for engaging an axle; and
wherein said rim comprises a pair of oppositely, axially extending support flange means for engaging said tire on either side as said tire deforms or flattens.

5. An improved tire-rim combination according to claim 4, wherein said rim is separable into axially extending halves, further comprising means for securing said halves to each other.

6. An improved tire-rim combination according to claim 4, wherein said torus-like body has a circular area of revolution and the axial length of said rim is greater than or equal to twice the undeformed radius of said circular area of revolution of said body but no greater than $\pi$ times said radius.

7. An improved tire-rim combination according to claim 6, wherein said rim comprises a central, cylindrical portion and each of said support flange means comprises a radially, outwardly flaring conical portion extending from said cylindrical portion and an axially extending cylindrical flange extending from said conical portion.

8. An improved tire-rim combination according to claim 7, wherein said rim is separable into axially extending halves, further comprising means for securing said halves to each other.

9. An improved tire-rim combination according to claim 7, wherein the diameter of said cylindrical flange portion is greater than the diameter of said inner diameter surface but less than or equal to three times said diameter of said inner diameter surface.

10. A method for moving a land vehicle over soft support surfaces such as beach sand or over irregular support surfaces such as rocky terrain, said method comprising the steps of:

providing said vehicle with at least one low pressure tire for engaging a tire supporting rim, said tire comprising a thin-walled torus-like body of elastomeric material, wherein the wall of said tire located adjacent to the said soft support surfaces or said irregular support surfaces is at least substantially free from reinforcing fabrics or cords; said body having an inner diameter surface for engaging such a said rim, said tire further comprising means for inflating said body to a low pressure configuration and an outer diameter surface for contacting said soft or irregular support surfaces; said elastomeric material of said thin-walled body having such elasticity and flexibility and said low pressure being such that when said body is mounted on such a rim, is inflated to said low pressure and is subjected to an axle load, said tire flexes to flatten substantially from its unloaded configuration and continues to flatten as said load is increased, so that said tire provides an enlarging contact area between said outer diameter surface and said soft surfaces as said load is increased whereby rolling friction is reduced between said tire and said soft surface, and said tire also stretches to deform substantially when said tire encounters an obstacle when said load is applied, whereby bouncing of said tire is reduced; providing a tire supporting rim having a substantially cylindrical outer surface engaging said inner diameter surface of said tire and a central opening for engaging an axle of said vehicle; and wherein said rim comprises a pair of oppositely, axially extending support flange means for engaging said tire on either side as said tire deforms or flattens; inflating said tire on said rim wheel to low pressure of up to 10 psi to permit said tire to flatten and deform substantially when said tire contacts such support surfaces with an axle load applied to said vehicle; and moving said vehicle across such support surfaces while said vehicle is supported on said tire.

11. An improved tire-rim combination for land vehicles intended to be operated on soft support surfaces such as beach sand or on irregular support surfaces such as rocky terrain, said combination comprising:

a low pressure tire for engaging a tire supporting rim, said tire comprising a thin-walled torus-like body of elastomeric material, said body having an inner diameter surface for engaging such a rim, said tire further comprising means for inflating said body to a low pressure configuration and an outer diameter surface for contacting said soft or irregular support surfaces; said elastomeric material of said thin-walled body having such elasticity and flexibility and said low pressure being such that when said body is mounted on such a rim, is inflated to said low pressure and is subjected to an axle load, said tire flexes to flatten substantially from its unloaded configuration and continues to flatten as said load is increased, so that said tire provides an enlarging contact area between said outer diameter surface and said soft surfaces as said load is increased whereby rolling friction is reduced between said tire and said soft surface, and said tire also stretches to deform substantially when said tire encounters an obstacle when said load is applied, whereby bouncing of said tire is reduced;

a tire supporting rim having a substantially cylindrical outer surface engaging said inner diameter surface of said tire and a central opening for engaging an axle;

wherein said rim comprises a pair of oppositely, axially extending support flange means for engaging said tire on either side as said tire deforms or flattens; and comprises a central, cylindrical portion and each of said support flange means comprises a radially, outwardly flaring conical portion extending from said cylindrical portion and an axially extending cylindrical flange extending from said conical portion.

12. An improved tire-rim combination according to claim 11, wherein said rim is separable into axially extending halves, further comprising means for securing said halves to each other.

13. An improved tire-rim combination according to claim 11, wherein the diameter of said cylindrical flange portion is greater than the diameter of said inner diameter surface but less than or equal to three times said diameter of said inner diameter surface.

14. An improved tire-rim combination for land vehicles intended to be operated on soft support surfaces such as beach sand or on irregular support surfaces such as rocky terrain, said combination comprising:

a low pressure tire for engaging a tire supporting rim, said tire comprising a thin-walled torus-like body of elastomeric material, said body having an inner diameter surface for engaging such a rim, said tire further comprising means for inflating said body to a low pressure configuration and an outer diameter surface for contacting said soft or irregular support surfaces; said elastomeric material of said thin-walled body having such elasticity and flexibility and said low pressure being such that when said body is mounted on such a rim, is inflated to said low pressure and is subjected to an axle load, said tire flexes to flatten substantially from its unloaded configuration and continues to flatten as said load is increased, so that said tire provides an enlarging contact area between said outer diameter surface and said soft surfaces as said load is increased whereby rolling friction is reduced between said tire and said soft surface, and said tire also stretches to deform substantially when said tire encounters an obstacle when said load is applied, whereby bouncing of said tire is reduced;

a tire supporting rim having a substantially cylindrical outer surface engaging said inner diameter surface of said tire and a central opening for engaging an axle;

wherein said rim comprises a pair of oppositely, axially extending support flange means for engaging said tire on either side as said tire deforms or flattens;

wherein said rim is separable into axially extending halves, further comprising means for securing said halves to each other; and wherein said tire comprises a radially inwardly extending flange which is captured between said halves in the assembled tire-rim combination.

* * * * *